219-121 SR
MTR04 OR 3,924,093

United States Patent [19]
Feldman et al.

[11] 3,924,093
[45] Dec. 2, 1975

[54] PATTERN DELINEATION METHOD AND PRODUCT SO PRODUCED

[75] Inventors: Martin Feldman, Murray Hill; Denis Lawrence Rousseau; William Robert Sinclair, both of Summit; Walter Werner Weick, Somerville, all of N.J.

[73] Assignee: Bell Telephone Laboratories, Incorporated, Murray Hill, N.J.

[22] Filed: May 9, 1973

[21] Appl. No.: 358,730

[52] U.S. Cl. ........... 219/121 LM; 96/38.3; 427/271
[51] Int. Cl.² ........... B23K 9/00
[58] Field of Search ......... 156/7, 8, 12; 96/44, 38.3; 219/121 L, 121 LM; 427/271

[56] References Cited

UNITED STATES PATENTS

| | | | |
|---|---|---|---|
| 3,258,898 | 7/1966 | Garibotti | 29/155.5 |
| 3,668,028 | 6/1972 | Short | 156/3 |
| 3,695,908 | 10/1972 | Szupillo | 117/8 |

*Primary Examiner*—William A. Powell
*Assistant Examiner*—Brian J. Leitten
*Attorney, Agent, or Firm*—G. S. Indig

[57] ABSTRACT

Supported photomasks useful in the fabrication of printed circuitry are produced by laser machining of amorphous iron oxide film blanks. Resolution improvement relative to that obtained by use of other film materials is ascribed to crystallization of film regions bordering those which are volatilized.

6 Claims, 2 Drawing Figures

PATTERN DELINEATION METHOD AND PRODUCT SO PRODUCED

BACKGROUND OF THE INVENTION

1. Field of the Invention

The invention is concerned with the fabrication of supported films of primary interest for masks or resists in the formation of printed circuitry.

2. Description of the Prior Art

A procedure for the quantity production of printed and integrated circuits involves exposure of photoresist layers by appropriate radiation through a mask. While masks used for pilot plant operations are commonly fabricated from photographic emulsions, interest is developing in substitution of other types of mask materials. Materials which have been studied extensively include thin films of materials such as gold, chromium, tantalum, etc. The prime advantage realized by substitution of such mask materials is durability so that expected lifetime, limited by damage due to contact printing and/or constant handling, is significantly increased.

Such "hard copy" masks are sometimes generated from master masks prepared by conventional techniques using photographic emulsions. Current studies, however, involve alternative procedures, notably using direct writing with radiation, which might result in selective removal of the film material so producing the hard copy mask directly.

A particularly promising procedure for direct generation of hard copy masks involves the use of laser beams to remove film material and is known as "laser machining" (see, D. Maydan, *Bell System Technical Journal* 50, p. 1761 July-August, 1971 and W. W. Weick, IEEE Journal Quantum Electronics, QE-8, p. 126, February, 1972). As evident from this reference laser machining has been studied on such materials as bismuth and gold.

At the present state of development as well as for near future use, it appears that laser machining will utilize relatively short duration, or pulsed, radiation. At this time, available laser instrumentation is such that machining of usual required patterns requires a pulse train of many pulses making up the traveling beam defining the pattern. Under these circumstances, a limitation on resolution, defined as the minimum shortest dimension of residual film material after machining, arises from an irregularity (along the border of machined patterns). This irregularity, which takes on the appearance of scalloping, typically evidences a periodicity corresponding with that of the generating laser pulses. This irregularity in pattern definition which may be the ultimate limit on laser machining is characteristically at a minimum of about 20 percent of the machining spot size for materials studied to date.

SUMMARY OF THE INVENTION

In accordance with the present invention, pattern delineation by volatilization due to selective irradiation with light is carried out using supported films of soluble iron oxide. Under conditions otherwise appropriate for such machining, resolution is significantly improved. For these purposes, resolution is defined as the regularity in a line border produced by machining with a succession of pulses.

The inventive teaching is critically dependent on the use of iron oxide films of appropriate properties. It has been found that such films, no matter how produced, are suitable providing that they are "soluble." Solubility for these purposes is defined as total removal of a film of a thickness of 10,000 Angstrom units upon immersion in an aqueous solution of 6N HCl for an hour at room temperature. Such soluble films may also be characterized as "amorphous" in the sense that neither X-ray nor electron beam diffraction analysis reveals long-range ordering over distances of 50 Angstrom units or greater.

Improvement in resolution is ascribed to the insolubilization, or crystallization, of the border regions in residual film adjacent pattern delineated regions, it appearing that this change in morphology significantly increases the power threshold for material removal.

DETAILED DESCRIPTION

1. Operative Mechanism

Figure 1:
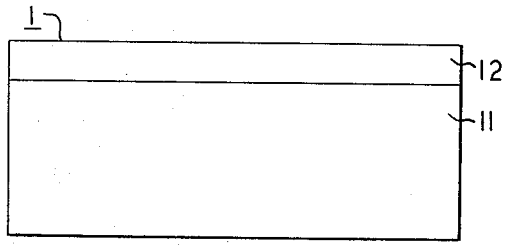
FIG. 1 is a front elevational view of an unprocessed blank consisting of a layer of soluble iron oxide on a substrate.

Iron oxide films characterized as "amorphous" or "soluble," as more completely discussed in Section 2 of this detailed description, have unique properties giving rise to the invention. The property of most significance is concerned with a morphology change from amorphous to crystalline (as defined) upon heating. During machining some center portion of the beam above a threshold power results in removal of film material as in usual laser machining. Regions of the quantum immediately adjacent are exposed to power levels below this threshold level. Due to this heating and to transverse heat transfer, regions bordering the film portions being removed attain a temperature at sufficient level and for sufficient time to result in some appreciable degree of crystallization. This crystallized border material has a threshold for removal which is appreciably higher than that of the amorphous material. This change in character possibly combined with other film characteristics, results in a sharper demarcation than obtains in usual materials in which there is no quatum jump in threshold.

The mechanism postulated above has support in experiment. For example, it is known from copending application Ser. No. 358,727 filed on May 9, 1973, and now U.S. Pat. No. 3,837,855 issued on Sept. 24, 1974, (Rousseau-Sinclair 1-12) that material evidencing increased crystallinity due to exposure to light becomes relatively insoluble. Solubility, it has been noted, may be tested in a number of solvent materials. 6N aqueous HCl at room temperature is used by some in the fabrication of iron oxide masks using resist techniques. As noted, immersion of unprocessed film of a thickness of 1$\mu$m in such a solvent results in total removal within an hour. It has also been learned that immersion of crystallized iron oxide resulting from exposure to light is not removed in that time period by that solvent. Machined specimens fabricated in accordance with the inventive teaching have been immersed in this solvent with resultant retention only of border regions outlining the pattern formed by the material removed by machining.

Further support for the mechanism derives from a different experiment: Samples of iron oxide film, the first evidencing no crystallinity (as defined by ordering beyond 50 Angstrom units), and the second differing only in that it was heated for a period of a minute or more at a temperature of about 450°C to result in substantial crystallization to α $Fe_2O_3$, were found to have different thresholds for material removal. In one such experiment in which samples were exposed to the same pulsed output of a Q-switched Nd-YAG laser of gradually increasing power, it was found that the threshold for removal for the crystallized film was at a level of 0.52 watts per square micron as compared to a value of only 0.36 watts per square micron for the uncrystallized film for a given set of conditions. In both instances pulses were of a duration of 250 nanoseconds separated by an interval of 40 microseconds. While threshold is defined as the minimal power required for removal (resulting in a spot of vanishingly small size), the actual spot size in this experiment was approximately 30 micrometers in diameter.

2. Nature of Unprocessed Film

The inventive process is dependent upon crystallization of an iron oxide film such as, film 12 of FIG. 1. This translates into the implicit requirement of the invention that the film before processing be amorphous, or, concomitantly, that it evidence a required degree of solubility. This implicit requirement applies regardless of the manner in which the oxide film is produced.

Suitable procedures for preparation of oxide films are known. Soluble films have been prepared by chemical vapor deposition from iron-containing compounds, such as, iron carbonyl; and, in fact, blanks prepared by this procedure are now commercially available, for example, from Town Labs, Somerville, New Jersey. Suitable films have also been prepared by sputtering, for example, in an atmosphere containing carbon monoxide. A recently developed procedure is described in copending application Ser. No. 358,728 filed on May 9, 1973 (L. F. Thompson Case 4). This procedure involves the oxidative breakdown of polyvinyl ferrocene or similar material which is ordinarily applied to the substrate in the form of a solution.

It is common practice to describe the soluble oxide film as "$Fe_2O_3$." There is, however, experimental basis indicating that the film is of somewhat more complex composition, and, in fact, that it may vary to some degree depending upon the procedure used for its preparation. For example, it has been noted that, under certain circumstances, the oxidized film contains considerable amounts of carbon. Under usual circumstances, this carbon is present in the form of compound $Fe_2(CO_3)_3$. Such inclusion is common where films are prepared from carbonyl, or by low temperature oxidation of polyvinyl ferrocene (380°C or less). Some workers have even postulated that the carbonate content of the film contributes to its solubility; and in substantiation, it has been observed that $CO_2$ is sometimes liberated during the insolubilization process. However, soluble (or amorphous) oxide films have been prepared under circumstances where carbonate content is not detectably present. For example, the same oxidation procedure for preparation of the film from polyvinyl ferrocene at temperatures above about 380°C (but below some maximum of approximately 420°C) results in suitably soluble oxide films with little or no evidence of carbonate content. Processing of soluble films, however prepared, at temperatures of 380°C or above but below about 420°C may result in liberation $CO_2$ without rendering the films insoluble and without resulting in substantial crystallization.

Regardless of the manner in which the oxide film is produced, it is considered proper to characterize it as "amorphous." It has been found that neither X-ray nor electron beam diffraction analysis reveals long-range ordering over distances of 50 Angstrom units or greater. It has been uniformly found that films characterized as amorphous within these indicated limits are suitable for use in the inventive process.

The essential requirement of the unprocessed oxidized iron film may be expressed alternatively in terms of absence of crystallographic ordering over distances of 50 Angstrom units or solubility, here defined as disappearance of a film of a thickness of 1$\mu$m in a period of one hour or less when wetted by aqueous 6N HCl at room temperature (e.g., about 20°C).

This particular reagent, while conveniently utilized as a standard for the purpose of this definition, is merely exemplary of a large class of etching media appropriate for screening suitable starting material.

Film thickness is a parameter which may be varied to suit the particular requirements of both pattern delineation and ultimate use. The invention does not depend upon film thickness—any feasible thickness may be removed by irradiation with a resolution improvement attributed to the mechanism of section 1 of this detailed description. While there are, in consequence, no strict limits on thickness, film continuity is assured by thicknesses of the order of 500 Angstrom units or even less and thicknesses of approximately 2$\mu$m are sufficient for presently contemplated needs. These limits discussed further on prescribe a probable working range.

The above limits on film thickness are otherwise suitable as determined by contrast at the low end and by resolution at the high end. A thickness of about 500 Angstrom units has been found sufficient for desired contrast, for example, in procedures utilizing common ultraviolet energized photoresists (for integrated circuit fabrication). A thickness of about 2 micrometers is considered a maximum limit for many purposes, since resolution is decreased to generally intolerable levels for greater thicknesses. Resolution due to edge spreading is proportional to that of the film thickness for many illumination systems.

3. Retained Irradiated Material

It has been established that retained irradiated film material is generally characterized by the structure of α $Fe_2O_3$. Under certain circumstances where conditions are such that there is significant loss in oxygen, some part of the material can be converted to $Fe_3O_4$. The essence of the invention insofar as applicable to the nature of this retained border region material does not reside in the particular chemical composition or precise crystallographic nature of such material but rather more generally in the change in morphology which results in improved regularity of delineated patterns. The fact that such border material shows long-range ordering, for example, by X-ray inspection and that it has been insolubilized, as evidenced by immersion for example in aqueous HCl, only serve to identify a probable mechanism responsible for the improved resolution.

4. Substrate

A detailed discussion of substrate requirements is not appropriate to this description. Substrates are generally selected on the basis of intended use and this, in turn, requires that they be capable of withstanding whatever conditions are encountered during processing. For see through mask use (amorphous iron oxide is quite transparent at wavelengths within the visible spectrum), substrate material must, of course, be sufficiently transparent to permit visual alignment. Mask use generally requires transparency sufficient to pass whatever radiation is to be utilized in fabrication of patterns using the product of the invention. (For usual photoresists, this requires transparency in the near ultraviolet spectrum.) Exemplary substrate materials for see through mask use are fused silica, sapphire, and mixed oxide glasses, such as, borosilicates, etc. Where the residual oxide film after machining is used as a resist, the substrate is, of course, the article being processed. This may constitute a simple or composite surface including such diverse materials as silicon, silica, tantalum oxide or nitride and a variety of metals, such as titanium, platinum, gold, tantalum, etc.

5. Processing

The description contained in this section is largely in terms of available apparatus. It is possible—indeed likely—that apparatus improvements in the future will permit more expedient processing.

For the purposes of this section, the processing is described in terms of "laser machining." The laser with its highly collimated, easily focused, small area, high peak power output is a most suitable tool for practicing the invention. It is likely that processing in the future too will utilize this instrument. The invention, however, has to do, inter alia, with the high resolution at border regions of pattern delineation and this advantage, as well as other characteristic of $Fe_2O_3$ material, are obtained regardless of the nature of the energy used for machining.

Discussion is largely in terms of a laser beam, perhaps focused or semifocused, which is pulsed and which is programmed to delineate the desired pattern. As discussed, pulsing is at this time required to satisfy certain kinetic problems. It is possible that sometime in the future availability of more powerful sources may permit overall exposure as through a mask or more rapid traversal so that machining may be considered as having been brought about in continuous fashion.

Much of the work reported herein utilized an Nd-YAG laser, and such a laser may be Q-switched or cavity-dumped to produce pulses of appropriate size, duration and peak power. Unprocessed iron oxide film is somewhat absorbing over a spectrum of wavelengths extending throughout the visible into the infrared and ultraviolet regions. "Light" sources, whether coherent or not, at any wavelength producing radiation otherwise sufficient for machining are suitable. Considerable experimentation has been carried out with a variety of other film materials, a variety of substrate materials, a variety of film thicknesses, and operating at different wavelengths. It has been found that threshold values for machining do not vary by orders of magnitude, for example, in accordance with the transparency or thickness of the film. Threshold values reported are considered reasonably illustrative within a factor of about three for a broad band of wavelengths, e.g., from 4,000 Angstrom units to 1.5$\mu$m.

Threshold Power

Minimum peak power required to remove a region of iron oxide 2100 Angstrom unit thick extending through the depth of the film to bare the substrate is dependent upon other parameters in accordance with the equation:

$$\frac{P_p}{A} t^{1/2} \cong 1.8(10)^{-4} \frac{\text{watt sec}^{1/2}}{\text{micron}^2} \quad (1)$$

in which $A$ = machined area, square microns
$P_p$ = peak laser power, watts
$t$ = time in seconds.

It is seen that peak power varies as $t^{-1/2}$. The particular value of $P_p$ defined is not useful for machining since by definition it results in a spot or a line which is infinitesimal in width. Practical limits for machining utilize power levels which are from 1.01 to 10 times threshold values. Below the indicated minimum, width of machined regions may be so small as to be unreliable due to unavoidable fluctuations in film temperature. Above a multiple of 10, removed regions are generally in excess of the dimensions comtemplated for most finely detailed masks. Further, above a multiple of ten, a substantially increasing width of crystallized border regions set an additional limit on permitted proximity of machined regions. It is known that most efficient utilization of a normal light source uses a power level which is approximately $e$ times threshold ($e$ is the natural logarithm base, or approximately 2.7). This assumes an energy distribution across the beam which is approximately Gaussian. Such a power level effectively utilizes a large portion of the total radiation energy and to a large extent, isolates removal rate from small fluctuations in beam power level.

For an Nd-YAG, Q-switched laser of pulse duration approximately 250 microseconds and with a film thickness of approximately 2100 Angstrom units, it was found the e times threshold value is about 0.98 watt per square micrometer. Due to $t^{-1/2}$ dependence, corresponding values for a microsecond duration pulse and a nanosecond duration pulse are approximately 0.72 watt per square micrometer and 15.2 watt per square micrometer. The dependence on time derives from heat dissipation. At some short duration, time constant for typical materials is such that heat dissipation is no longer a factor; so that power for very short duration pulses becomes time-independent. Under usual circumstances, this limit sets in for a pulse of between 1 and 10 nanoseconds.

Pulse Interval

The parameter of concern here is that which enables film and substrate to cool sufficiently so that loss in resolution due, for example, to unwanted removal or crystallization of border regions of width greater than the desired feature dimension are avoided. In large part heat dissipation concerns the substrate since it is almost of infinite thickness relative to usual supported film thicknesses. A useful parameter is the time constant of the substrate defined as the time necessary to allow the heated region of the substrate to cool to $1/e$ of the peak temperature value attained ($e$ is the natural logarithm base numerically approximately equal to 2.7). Time constants for usual glassy substrate materials such as soda lime glass or fused silicon, are about 300 nanoseconds. It is generally desirable that pulse separation be at least equal to the time constants for the substrate. This may not be a requirement where only a small number of pulses are utilized or where the beam traverses the film at a rapid rate so that machining is always being carried out in a "cool" region.

6. The Drawing

Figure 2:
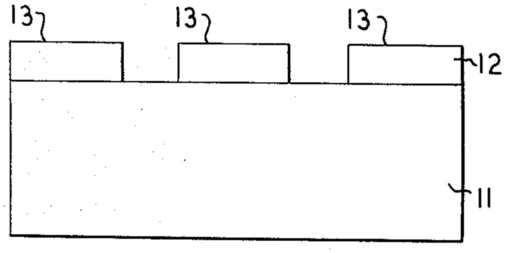
FIG. 2 is a front elevational view of the structure shown in FIG. 1 after machining by selective irradiation in accordance with the invention.

FIGS. 1 and 2 depict a blank 1 comprising supported oxidized iron film before and after machining. In FIG. 1, film 12 of a thickness of the order of 2,000 Angstrom units is shown supported on substrate 11, typically constructed of glass or other material. Substrate 11 is suitably transparent to the radiation to be used during pattern fabrication utilizing masks produced from the blank.

In FIG. 2, machining, for example, by an Nd-YAG laser, has resulted in removal of film material 12 in selected regions so resulting in residual film portions 13.

7. Examples

1. A blank of dimensions approximately 1×3 inches consisting of 2100 Angstrom units thick film of amorphous iron oxide on a glass substrate of 60 mils thickness was laser machined by use of a Q-switched Nd-YAG laser. The threshold power level was experimentally determined to be about 0.36 watt per square micrometer. The *e* times threshold power was therefore about 0.98 watt per square micrometer and the laser was operated at this level. The pulse duration was 250 nanoseconds with interpulse spacing of approximately 40 microseconds. Movement of the laser beam was at such a rate that illuminated spots (about 35 micrometers in diameter) overlapped by about 16 micrometers. A pattern consisting of lines having a feature dimension (shortest dimension of unremoved material) of about 70 micrometers was produced. Width of removed material produced by a single pass was about 35 micrometers. There was no apparent residue on the substrate in machined areas and little evidence of substrate removal. Line regularity at the border region was approximately 2 micrometers for a region of about 35 micrometers in width.

2. The procedure of Example 1 was repeated utilizing a cavity-dumped Nd-YAG laser. A relatively simple pattern was produced. Feature dimension was approximately 20 micrometers and width of material removed on single pass was about 8 micrometers.

3.The procedure of Example 1 was repeated utilizing a 2×2 inch substrate. A simple pattern was produced and laser machined pattern and support were immersed in 6N HCl at room temperature for a period of approximately 15 minutes. Upon removal it was seen that removed regions approximately 1 mil in diameter were bordered by residual material for a border width of approximately 2 micrometers. All other film material was dissolved.

4. The procedure of Example 1 was repeated, however, utilizing a cavity-dumped laser. The shortest dimension of removed material was about 8 micrometers. A border of approximately 1 micrometer of residual material remained after immersion.

In all of the above examples, regularity was approximetely 2 micrometers as described in Example 1, except that in Examples 2 and 4 regularity was approximately 1 micrometer. Similar experimental runs conducted utilizing films of copper oxide, gold, chromium, tantalum, aluminum, molybdenum, etc., showed a regularity of about twice this amount on the same basis.

What is claimed is:

1. Procedure for the fabrication of a substrate-supported pattern-delineated film, in which delineation comprises selectively removing film thereby resulting in exposed substrate, comprising irradiating portions of said film with electromagnetic radiation to remove film within said portions by volatilization thereby baring underlying substrate, characterized in that the said film comprises oxidized iron with said film being sufficiently soluble such that a film thickness of 10,000 Angstrom units is removed by dissolution in an aqueous solution of 6N HC*l* (6 normal HC*l*) in one hour at room temperature— e.g., about 20°C)—in which the said electromagnetic radiation is the coherent output of a laser and in which the laser output is pulsed with pulse duration of a maximum of approximately 1 microsecond.

2. Procedure of claim 1 in which the interpulse spacing is at least equal to the time constant of the substrate with said time constant being defined as the time interval required to result in a reduction in peak temperature due to irradiation to the fraction 1/e where *e* is the natural logarithm base.

3. Procedure of claim 1 in which the laser is Q-switched.

4. Procedure of claim 3 where the laser contains neodymium as the essential ion.

5. Procedure of claim 1 where the said laser is cavity-dumped.

6. Procedure of claim 5 where the laser contains neodymium as the essential ion.

* * * * *

UNITED STATES PATENT AND TRADEMARK OFFICE

CERTIFICATE OF CORRECTION

PATENT NO. : 3,924,093

DATED : December 2, 1975

INVENTOR(S) : Martin Feldman, Denis L. Rousseau, William R. Sinclair, and Walter W. Weick It is certified that error appears in the above-identified patent and that said Letters Patent are hereby corrected as shown below:

Column 2, line 34, "quantum" should read --film--.

Column 2, line 45, "quatum" should read --quantum--.

Signed and Sealed this

Sixteenth Day of November 1976

[SEAL]

*Attest:*

RUTH C. MASON
*Attesting Officer*

C. MARSHALL DANN
*Commissioner of Patents and Trademarks*